United States Patent [19]

Inoue

[11] Patent Number: 5,119,920
[45] Date of Patent: Jun. 9, 1992

[54] TEMPERATURE-CONTROLLED FAN FLUID COUPLING

[75] Inventor: Hiroshi Inoue, Fuji, Japan

[73] Assignee: Usui Kokusai Sangyo Kaisha, Ltd., Japan

[21] Appl. No.: 657,745

[22] Filed: Feb. 19, 1991

[30] Foreign Application Priority Data

Feb. 17, 1990 [JP] Japan ................. 2-14858[U]
Feb. 17, 1990 [JP] Japan ................. 2-14859[U]

[51] Int. Cl.$^5$ .............................................. F16D 35/02
[52] U.S. Cl. .................................. 192/58 B; 192/82 T
[58] Field of Search .......................... 192/58 B, 82 T; 123/41.12

[56] References Cited

U.S. PATENT DOCUMENTS

| | | | |
|---|---|---|---|
| 2,879,755 | 3/1959 | Weir | 123/41.12 |
| 2,988,188 | 6/1961 | Tauschek | 192/82 T |
| 3,059,745 | 10/1962 | Tauschek | 192/58 B |
| 3,217,849 | 11/1965 | Weir | 192/82 T |
| 3,259,221 | 7/1966 | Godfrey | 192/58 B |
| 3,272,188 | 9/1966 | Sabat | 192/41.11 |
| 3,339,688 | 9/1967 | Harvey | 192/58 B |
| 3,363,734 | 1/1968 | Sabat | 192/58 B |
| 3,430,743 | 3/1969 | Fujita et al. | 192/58 B |
| 3,463,282 | 8/1969 | Fujita et al. | 192/58 B |
| 3,727,735 | 4/1973 | La Flame | 192/58 B |
| 3,840,101 | 10/1974 | Peter et al. | 192/58 B |
| 3,856,122 | 12/1974 | Leichliter | 192/58 B |
| 3,964,582 | 6/1976 | Mitchell | 192/58 B |
| 4,238,016 | 12/1980 | Yoshida et al. | 192/58 B |
| 4,281,750 | 8/1981 | Clancey | 192/58 B |
| 4,381,051 | 4/1983 | Kikuchi | 192/82 T |
| 4,403,684 | 9/1983 | Haeck | 192/58 B |
| 4,505,367 | 3/1985 | Martin | 192/58 B |
| 4,629,046 | 12/1986 | Martin | 192/58 B |
| 4,665,694 | 5/1987 | Brunken | 60/330 |
| 4,667,791 | 5/1987 | Martin et al. | 192/58 B |
| 4,685,549 | 8/1987 | Brunken et al. | 192/58 B |
| 4,699,258 | 10/1987 | Johnston et al. | 192/58 B |
| 4,796,571 | 1/1989 | Ono et al. | 123/41.12 |
| 4,846,331 | 7/1989 | Ono | 192/58 B |
| 4,850,465 | 7/1989 | Ono | 192/58 B |
| 4,903,643 | 2/1990 | Takikawa et al. | 123/41.12 |
| 4,903,805 | 2/1990 | Ono | 192/58 B |
| 4,930,457 | 6/1990 | Tamai | 123/41.12 |
| 4,930,458 | 6/1990 | Takikawa et al. | 123/41.12 |

FOREIGN PATENT DOCUMENTS

| | | |
|---|---|---|
| 55-76226 | 6/1980 | Japan . |
| 57-167533 | 10/1982 | Japan . |
| 57-179431 | 11/1982 | Japan . |
| 62-124330 | 6/1987 | Japan . |
| 2153980 | 8/1985 | United Kingdom ......... 192/82 T |

Primary Examiner—Richard Lorence
Attorney, Agent, or Firm—Anthony J. Casella; Gerald E. Hespos

[57] ABSTRACT

A temperature-controlled fan fluid coupling for controlling a fan that provides cooling air to an automotive engine in response to the engine temperature. The coupling comprises a drive disk provided with communication holes, a rotor on which the drive disk is mounted, an enclosed housing held to the rotor, a cooling fan mounted on the housing, a partition plate that divides the inside of the housing into an oil reservoir chamber and a torque transmission chamber in which the drive disk is mounted, an oil outflow-adjusting hole formed in the partition plate, a circulation passage extending from the torque transmission chamber into the oil reservoir chamber, a main valve member, a bimetallic strip mounted on the front face of the cover of the housing and deforming with temperature, a torque transmission gap, a circulation hole formed in the partition plate and disposed substantially opposite to the communication hole in the drive disk, a short auxiliary valve member which can engage the communication hole to close off it, and adjusting holes formed in the auxiliary valve member. When the ambient temperature exceeds a preset temperature, the main valve member opens the outflow-adjusting hole. The fan fluid coupling can be partially engaged by actuating either the resilient valve member or the auxiliary valve member.

17 Claims, 5 Drawing Sheets

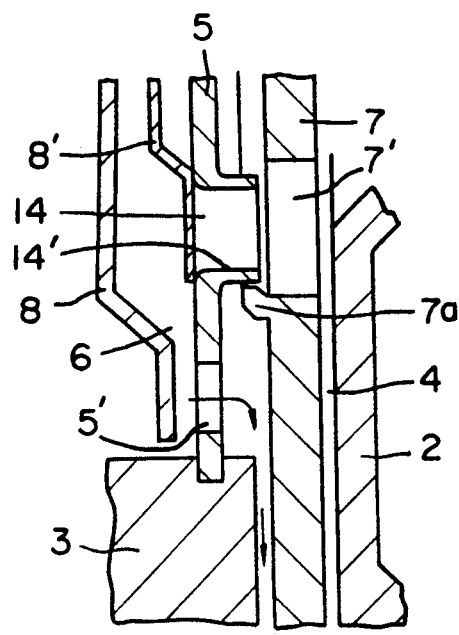
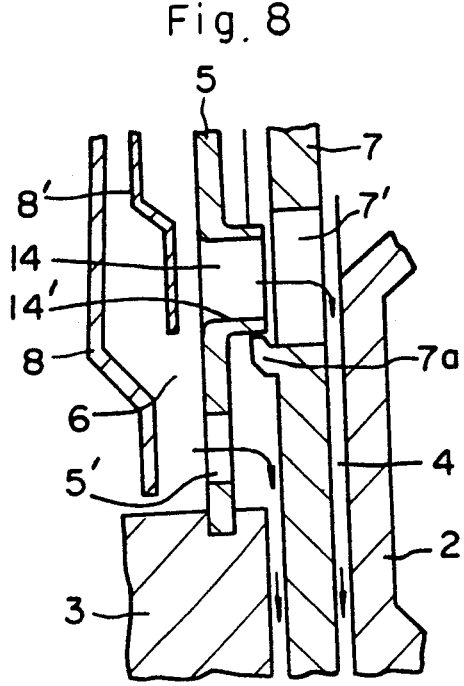
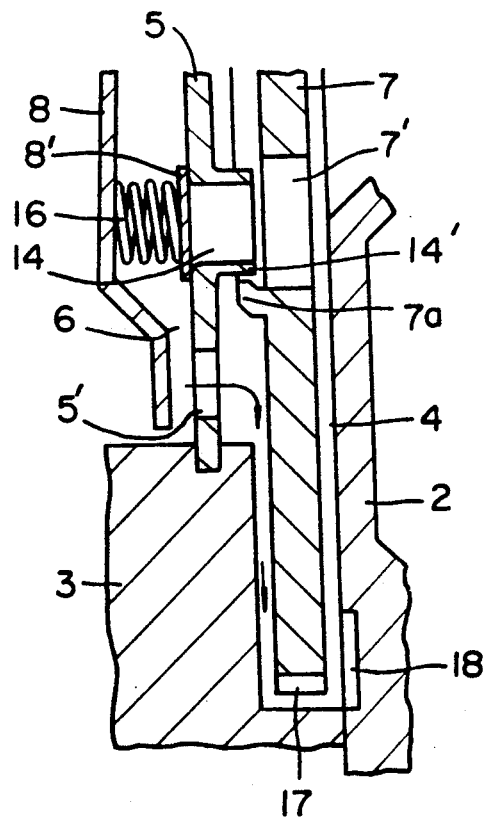

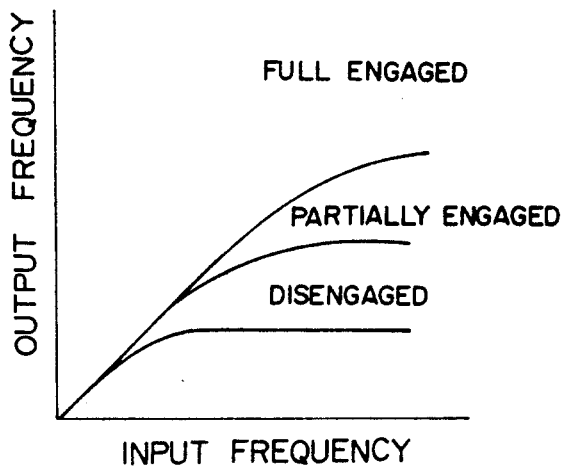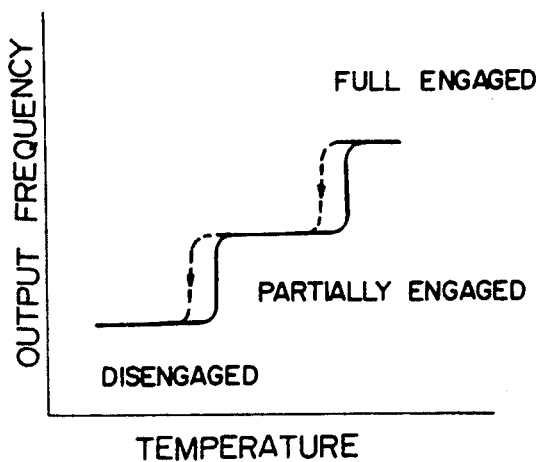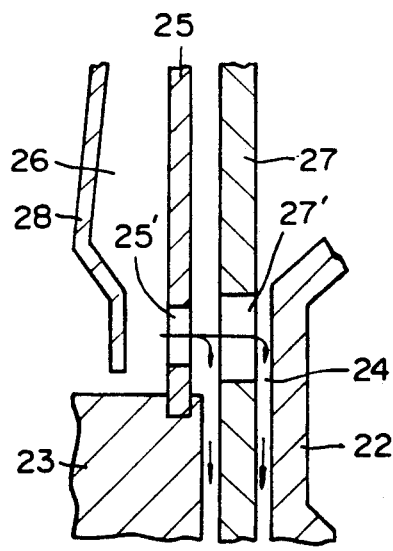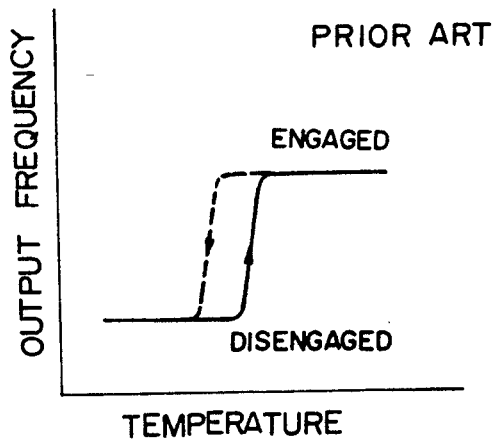

TEMPERATURE-CONTROLLED FAN FLUID COUPLING

BACKGROUND OF THE INVENTION

1. Field of the Invention

The present invention generally relates to an improved temperature-controlled fan fluid coupling which controls the rotation of a fan for cooling an automotive engine in such a way that the amount of cooling air supplied to the engine always corresponds to the temperature around the engine while the automobile is running.

2. Description of the Prior Art

Main portions of a conventional fan fluid coupling of this kind are shown in FIG. 12. This fluid coupling comprises a casing 22, a cover 23 forming an enclosed housing, a partition plate 25 provided with an outflow-adjusting hole 25', a torque transmission chamber 24, an oil reservoir chamber 26, a single valve member 28, and a drive disk 27 having a communication hole 27'. The outflow-adjusting hole 25' is located on the side of the torque transmission chamber 24. The valve member 28 is located on the side of the oil reservoir chamber 26 and mounted at its one end to the partition plate 25. The valve member 28 opens or closes the hole 25' to increase or decrease the effective area in contact with oil in the torque transmission gap. In this way, the transmitted torque is controlled.

In the above-described prior art technique, the single outflow-adjusting hole 25' is opened or closed by the single valve member 28. Thus, the coupling can assume only two states, i.e., the coupling is disengaged or engaged. The output rotational frequency characteristic is shown in FIG. 13. As can be seen from this graph, the transmitted torque changes suddenly at a predetermined temperature. Therefore, the amount of cooling air becomes excessive or insufficient at temperatures close to the predetermined temperatures. Also, fan noise is induced by these functions. Furthermore, the bearing and the fan members get fatigued quickly and may become damaged or deformed.

SUMMARY OF THE INVENTION

It is an object of the invention to provide a durable temperature-controlled fan fluid coupling which can assume partially engaged condition, as well as fully engaged condition, in response to the temperature of air coming from an automotive engine to more smoothly and more appropriately control the amount of cooling air supplied to the engine at moderate engine temperatures than heretofore and which reduces fan noise and the fatigue of the bearing and the fan members, thereby preventing them from getting damaged or deformed.

The above object is achieved by a fan fluid coupling comprising: a drive disk provided with a plurality of communication holes at its front end; a rotor on which the drive disk is firmly mounted; an enclosed housing held to the rotor via a bearing and consisting of a case and a cover; a cooling fan mounted on the outer periphery of the cover; a partition plate that divides the inside of the housing into an oil reservoir chamber and a torque transmission chamber in which the drive disk is mounted; an oil outflow-adjusting hole formed in the partition plate; a dam formed in a part of the inner surface of the housing opposite to the outer surface of the drive disk on which oil collects during rotation; a circulation passage communicating with the dam and extending from the torque transmission chamber into the oil reservoir chamber; a resilient valve member mounted in the housing and having a free end portion which, when the ambient temperature exceeds a preset temperature, opens the outflow-adjusting hole in the partition plate and which, when the ambient temperature is below the preset temperature, closes the hole, the valve member being mounted on the side of the oil reservoir chamber, the end of the valve member opposite to the free end portion being fixed; a temperature-sensing device which is mounted on the front surface of the cover and deforms with temperature, the valve member interlocking with the temperature-sensing device; a torque transmission gap formed between the opposite walls that are formed by the drive disk, the case, and the cover near the outer end of the fan fluid coupling; a circulation hole formed in the partition plate and disposed substantially opposite to the communication hole in the drive disk; a short auxiliary valve mechanism which can engage the circulation hole to close or open it, the auxiliary valve mechanism being axially spaced from the resilient valve member, the auxiliary valve mechanism having one end fixed, the fan fluid coupling being capable of being partially engaged by actuating either the resilient valve member or the auxiliary valve member; a plurality of adjusting holes formed in the side surfaces of the auxiliary valve member; whereby the torque transmitted from the driving rotor to the driven enclosed housing is controlled by increasing and decreasing the effective area in contact with oil in the torque transmission gap.

The above-mentioned auxiliary valve mechanism is composed of a cap-shaped or annular ring-shaped auxiliary valve member having an end fixed to the resilient valve member and provided at its peripheral wall with an adjusting hole, an auxiliary valve member having an end fixed to the resilient valve member or an auxiliary valve member associated with a helical spring means having an end fixed to the resilient valve member.

In the novel fan fluid coupling constructed as described above, when the ambient temperature is low, the outflow-adjusting hole and the circulation hole are closed by the resilient valve member and the auxiliary valve member, respectively. If the temperature then rises, the resilient valve member opens the outflow-adjusting hole to force the oil collected in the oil reservoir chamber toward the rear side of the torque transmission chamber forming the transmission gap. In this state, the coupling is partially engaged. If the temperature rises further, the auxiliary valve member opens the circulation hole to force the oil toward the front side of the torque transmission chamber. Under this condition, the coupling is fully engaged, and a sufficient amount of cooling air is supplied. Conversely, when the ambient temperature drops, the auxiliary valve member closes the circulation hole to permit the oil to flow out only toward the front side of the transmission gap. At this time, the coupling is kept partially engaged. As the temperature drops further, the resilient valve member closes the outflow-adjusting hole, so that the coupling is fully engaged. In this way, the fan fluid coupling can assume two engaged states, i.e., partially engaged state and fully engaged state. Therefore, when the engine temperature is moderate, the amount of cooling air is prevented from becoming excessive or insufficient. Since the coupling assumes intermediate state, it operates smoothly and exhibits high performance. Also, noise of the fan produced by increases and decreases in the rotational frequency can be reduced. Furthermore, the bearing and the fan members become less fatigued. Therefore, it is unlikely that they become damaged or deformed. Hence, the fan fluid coupling shows high durability.

BRIEF DESCRIPTION OF THE DRAWINGS

FIG. 7 is an enlarged cross-sectional view of main portion of the coupling shown in FIG. 6, wherein the coupling is partially engaged;

FIG. 8 is a view similar to FIG. 2, wherein the coupling is fully engaged;

FIG. 9 is an enlarged cross-sectional view showing a modification of the embodiment shown in FIG. 7;

FIG. 10 is a graph in which the output rotational frequency of a fan used with a fan fluid according to the invention is plotted against the input rotational frequency;

FIG. 11 is a graph in which the output rotational frequency of a fan used with a fan fluid coupling according to the invention is plotted against the engine temperature;

FIG. 12 is a partially cutaway enlarged cross section of a known fan fluid coupling, correspondin to FIGS. 2 and 3; and FIG. 13 is a graph showing the characteristic of the fan fluid coupling shown in FIG. 12.

DETAILED DESCRIPTION OF THE PREFERRED EMBODIMENTS

Figure 1:
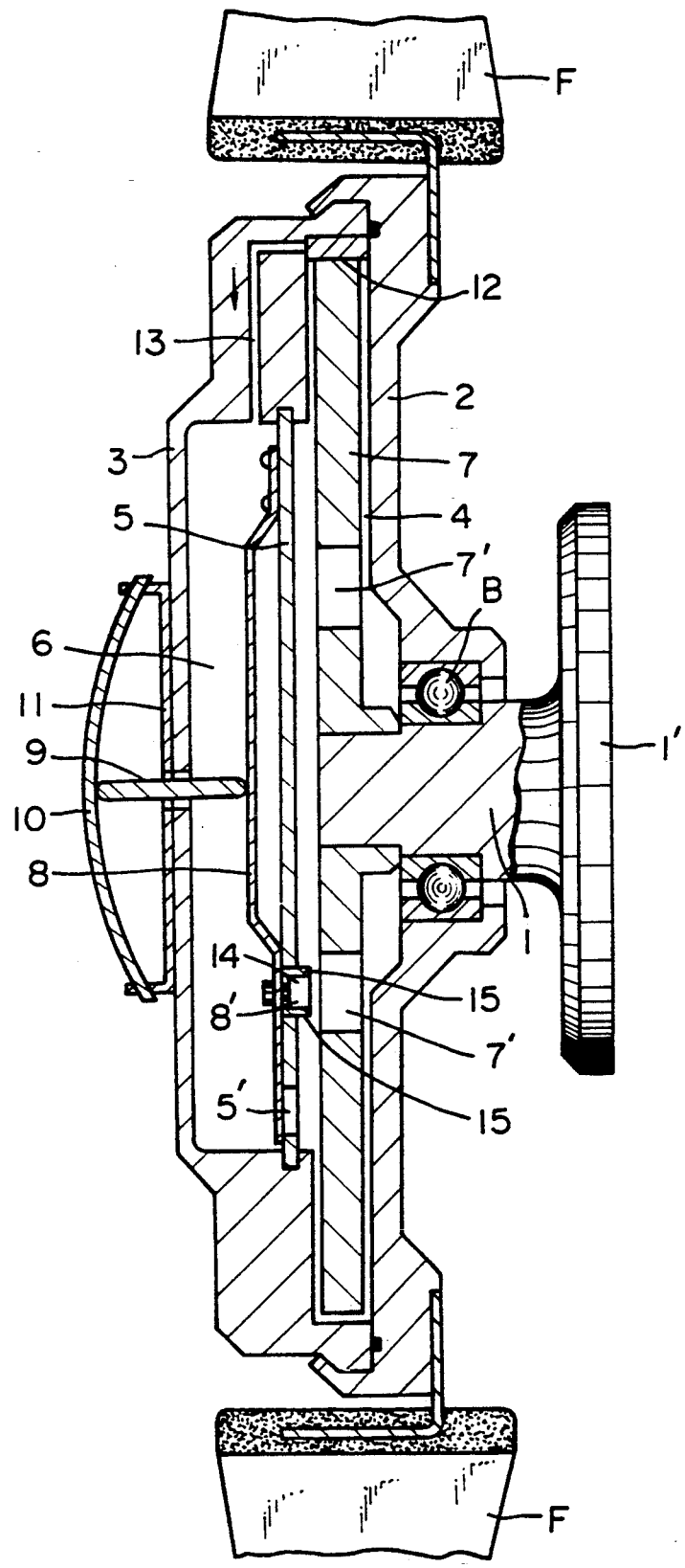
FIG. 1 is a partially cutaway vertical cross section of a temperature-controlled fan fluid coupling according to the invention, and in which the coupling is disengaged.
Figure 2:
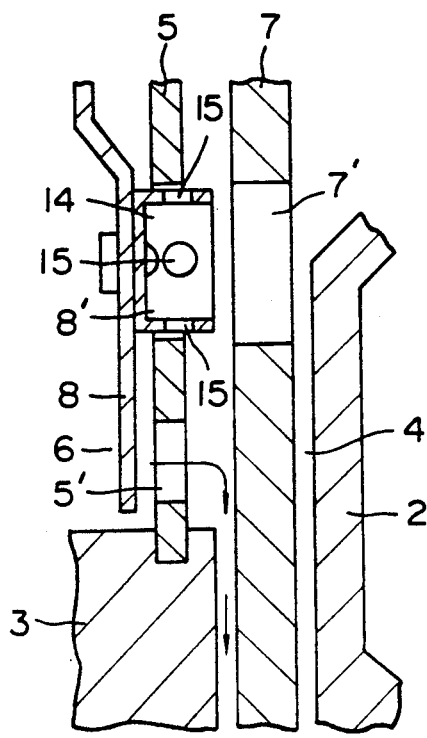
FIG. 2 is an enlarged cross-sectional view of main portions of the coupling shown in FIG. 1, and in which the coupling is partially engaged.
Figure 3:
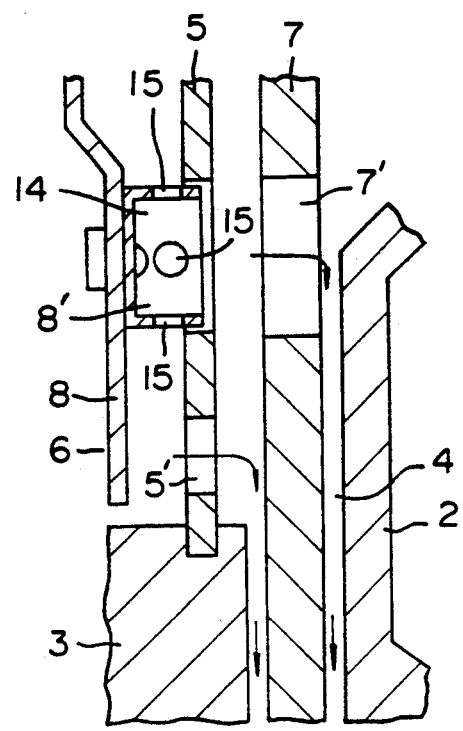
FIG. 3 is a view similar to FIG. 2, but in which the coupling is fully engaged.
Figure 4:
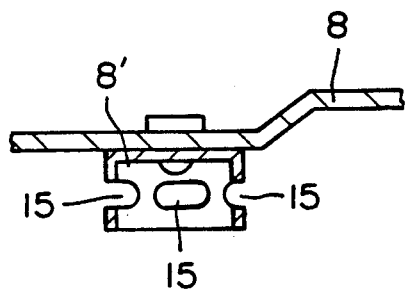
FIGS. 4 and 5 are enlarged vertical cross sections showing respectively a modification of auxiliary valve member according to the invention.
Figure 5:
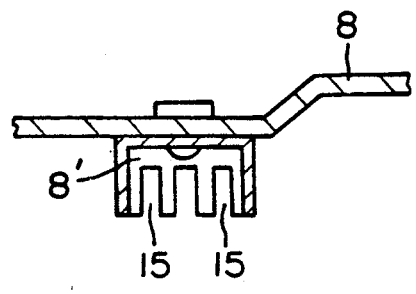
Figure 6:
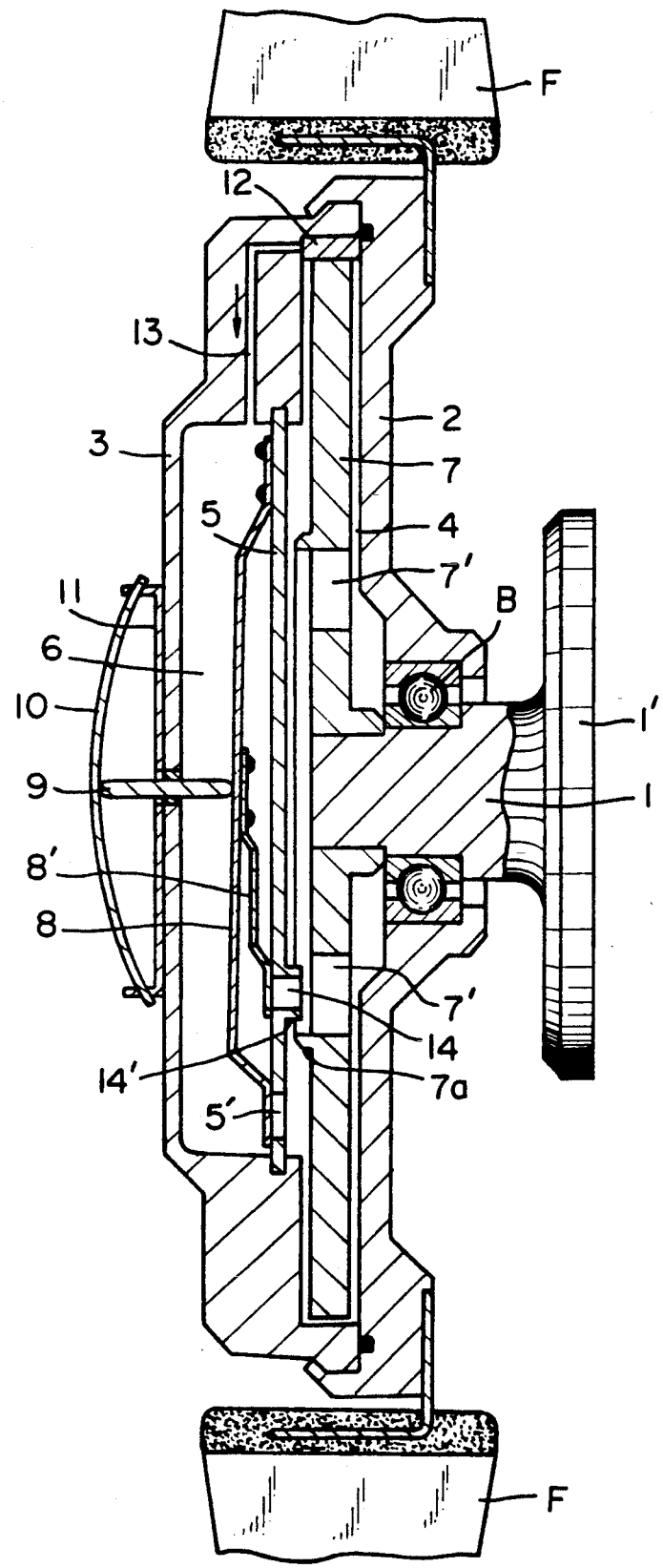
FIG. 6 is a partially cutaway vertical cross section showing a modified temperature-controlled fan fluid coupling of the invention, in which the coupling is disengaged.

Referring to FIGS. 1-5, wherein the same reference numeral indicates the same composing member, a drive disk 7 is firmly mounted on a rotor 1. A plurality of communication holes 7' are formed at its front end. The rotor 1 has a flange 1' at its rear end, the flange being mounted to the corresponding base. These rotor and drive disk form a driving portion. An enclosed housing consisting of a case 2 and a cover 3 is supported on the rotor1 via a bearing B. A cooling fan F is mounted on the outer surface of the case 2. The inside of the housing is partitioned into an oil reservoir chamber 6 and a torque transmission chamber 4 by a partition plate 5. The drive disk 7 is mounted in the transmission chamber 4. The partition plate 5 is provided with an outflow-adjusting hole 5' to control the flow of oil from the oil reservoir chamber 6 into the torque transmission chamber 4. The partition plate 5 is further provided with a circulation hole 14 radially inside the adjusting hole 5'. The circulation hole 14 can face the communication holes 7' formed in the drive disk 7. A very narrow gap is maintained between the disk 7 and the opposite outer surface of the enclosed housing including the partition plate 5 to transmit torque, the disk 7 being disposed in the torque transmission chamber 4. The outflow-adjusting hole 5' is opened or closed by a main valve member 8 whose one end is riveted to the wall surface of the partition plate 5 on the side of the oil reservoir chamber 6. That portion of the valve member 8 which is opposite to the riveted end can cover the outflow-adjusting hole 5'. An auxiliary valve member 8' taking the form of a short cap (FIG. 1) or ring (not shown) is attached at its one end to the main valve member 8. The auxiliary valve member 8' is provided with a plurality of adjusting holes 15 in its side surfaces, each hole 15 consisting of a circular hole (FIG. 2), slot (FIG. 4), or slit (FIG. 5). The auxiliary valve member 8' can engage the circulation hole 14 to close it off. A metallic fixture 11 is fixed to the front face of the cover 3. A temperature-sensing device 10 consisting of a bimetallic strip is anchored at its both ends to the fixture 11. The sensing device 10 deforms as the ambient temperature varies. The main valve member 8 interlocks with the temperature-sensing device 10 via connecting rod 9. A dam 12 is formed in a part of the inner surface of the enclosed housing that is opposite to the outer surface of the drive disk 7 on which oil collects during rotation. An intake port is formed close to and upstream of the dam in the direction of rotation. A circulation passage 13 extends from the torque transmission chamber 4 to the oil reservoir chamber 6, the transmission chamber 4 being in communication with the intake port. Oil is pumped through this circulation passage 13.

FIGS. 6 to 9 show the modified embodiments of the main valve member and the auxiliary valve member according to the invention. Referring to FIGS. 6 to 9, the auxiliary valve member 8' which is separately formed from the main valve member 8 is provided with an end fixed to the main valve member 8 (FIG. 6) or associated with a helical spring 16 having an end fixed to the main valve member 8 (FIG. 9). The circulation hole 14 is provided around its peripheral portion with a protrusion wall 14' extending toward the communication hole 7' to be in close vicinity to the surface of the communication hole so that flowing of the oil only into the rear portion of the torque transmission gap through the communication hole 7' can be ensured when the circulation hole 14 is opened. An annular protrudent barrier 7a is provided on an outer front surface of the drive disk 7 to surround all of a plurality of the communication holes 7'. This annular protrudent barrier 7a further ensures with the aid of the protrusion wall 14' the flowing of the oil only into the rear portion of the torque transmission gap when the circulation hole 14 is opened. If necessary, a toothed surface 17 may be formed on the outermost peripheral wall of the drive disk 7 and a finned wall 18 may be provided on the inner surface of the enclosed housing opposite to the outermost wall of the drive disk. The provision of the toothed surface 17 or the finned wall 18 is to efficiently prevent the oil from flowing toward the front side of the torque transmission gas so as to keep the oil in the rear side of the torque transmission gas when the auxiliary valve member 8' opens the circulation hole 14 and the coupling is partially engaged.

Furthermore, if necessary, a spacer (not shown) may be interposed between the main valve member 8 and the auxiliary valve member 8' at or around the central portion of the coupling where these two valve members are in contact with each other or, alternatively, a weight (not shown) may be provided at or around an extreme end of either the main valve member 8 or the auxiliary valve member 8', thereby being capable of adjusting a resiliency of these valve members.

As described thus far, in the novel temperature-controlled fan fluid coupling, the oil is allowed to flow out toward the rear side of the torque transmission gap by the auxiliary valve member 8' that opens the specially formed circulation hole 14 in response to the temperature. Under this condition, the coupling is partially engaged. In this way, the torque is either fully or partially transmitted, depending on the temperature. Therefore, the amount of cooling air supplied to the engine is prevented from becoming excessive or insufficient at moderate engine temperatures; rather the amount of cooling air is made as appropriate as possible. Hence, the coupling operates more smoothly than the prior art fan fluid coupling and exhibits higher performance. Moreover, noise of the fan produced when the rotational speed is increased and decreased is reduced. In addition, the bearing and the fan members become less fatigued. This reduces the possibility of damage or deformation of these components. Consequently, the coupling can be used for a long time.

What is claimed is:

1. A temperature-controlled fan fluid coupling comprising:
    a drive disk provided with a plurality of communication holes at its front end extending therethrough and having an outer circumferential surface;
    a rotor on which the drive disk is firmly mounted;
    an enclosed housing held to the rotor via a bearing and comprising a case and a cover, said enclosed housing having an inside defining an inner surface, the case of the housing further having an outer periphery;
    a cooling fan mounted on the outer periphery of the case;
    a partition plate dividing the inside of the housing into an oil reservoir chamber and a torque transmission chamber in which the drive disk is mounted;
    an oil outflow-adjusting hole formed in the partition plate;
    a dam formed in a part of the inner surface of the housing opposite to the outer surface of the drive disk on which oil collects during rotation;
    a circulation passage communicating with the dam and extending from the torque transmission chamber into the oil reservoir chamber;
    a resilient valve member having a free end portion which, when the ambient temperature exceeds a preset temperature, opens the outflow-adjusting hole in the partition plate and which, when the ambient temperature is below the preset temperature, closes the outflow-adjusting hole, the valve member being mounted on a side of the partition plate in the oil reservoir chamber, the end of the valve member opposite to the free end portion being fixed;
    a temperature-sensing device mounted on the cover and being deformable with temperature, the valve member being in engagement with the temperature-sensing device;
    a torque transmission gap formed between opposite walls of the drive disk and the inner surface of the housing;
    a circulation hole formed in the partition plate at a location radially spaced from the outflow-adjusting hole;
    an auxiliary valve means mounted to the resilient valve member for selectively engaging the circulation hole in the partition plate in response to movement of the resilient valve member, said auxiliary valve means being dimensioned to at least partly close the circulation hole prior to closing of the outflow-adjusting hole by the resilient valve member and to open the circulation hole subsequent to opening the outflow-adjusting hole by the resilient valve member; and
    at least one communication hole formed in the drive disk and disposed at a radial position substantially the same as the radial position of the circulation hole;
    whereby the torque transmitted from the rotor to the enclosed housing is controlled by increasing and decreasing the effective area in contact with oil in the torque transmission gap by sequentially opening and closing of the outflow-adjusting hole and the circulation hole by the resilient valve member and the auxiliary valve means.

2. The temperature-controlled fan fluid coupling of claim 1, wherein said auxiliary valve means is a short member taking the form of a cap with side surfaces and having a plurality of adjusting holes.

3. The temperature-controlled fan fluid coupling of claim 2, wherein each of said adjusting holes is a circle.

4. The temperature-controlled fan fluid coupling of claim 2, wherein each of said adjusting holes is a slot.

5. The temperature-controlled fan fluid coupling of claim 2, wherein each of said adjusting holes is a slit.

6. The temperature-controlled fan fluid coupling of claim 1, wherein said auxiliary valve means consists of an auxiliary valve member, an end of which being fixed to said resilient valve member.

7. The temperature-controlled fan fluid coupling of claim 1, wherein said auxiliary valve means consists of an auxiliary valve member, an end of which being associated with a helical spring means having an end fixed to said resilient valve member.

8. The temperature-controlled fan fluid coupling of claim 6, wherein the at least one communication hole comprises a plurality of communication holes and wherein an annular protrudent barrier is provided on said drive disk and protruding into the oil reservoir chamber and surrounding all of the communication holes.

9. The temperature-controlled fan fluid coupling of claim 6, wherein a protrusion wall which extends toward said communication hole is formed around a peripheral portion of said circulation hole.

10. The temperature-controlled fan fluid coupling of claim 7, wherein the at least one communication hole comprises a plurality of communication holes and wherein an annular protrudent barrier is provided on said drive disk and protruding into the oil reservoir chamber and surrounding all of the communication holes.

11. The temperature-controlled fan fluid coupling of claim 7, wherein a protrusion wall which extends toward said communication hole is formed around a peripheral portion of said circulation hole.

12. A temperature-controlled fan fluid coupling comprising:
    a rotor driveable for rotation about a rotational axis;

an enclosed housing rotatably mounted to the rotor, an oil reservoir chamber and a torque transmission chamber being defined within the enclosed housing, and a circulation passage extending through the housing from the torque transmission chamber to the oil reservoir chamber;

a partition plate mounted in the housing and separating the oil reservoir chamber from the torque transmission chamber, an oil outflow-adjusting hole and a circulation hole formed through the partition plate at radially spaced positions thereon for providing communication between the oil reservoir chamber and the torque transmission chamber;

a dam formed in the housing and extending into the torque transmission chamber thereof in proximity to the circulation passage for urging oil from the torque transmission chamber to oil reservoir chamber;

a drive disk rigidly mounted to the rotor for rotation therewith and disposed in the torque transmission chamber of the housing, such that a torque transmission gap is defined between the drive disk and the housing, the drive disk having a plurality of communication holes extending therethrough at a selected radially distance from the rotational axis substantially equal to the radial position of the circulation hole in the partition plate;

a temperature sensing device mounted on the housing and being deformable with temperature change;

a resilient valve member disposed in the oil reservoir chamber and having an end fixed to the partition plate and having a free end selectively moveable into a position for alternately blocking and opening the oil outflow-adjusting hole in the partition plate, the resilient valve member being engaged with the temperature-sensing device for movement in response to deformation of the temperature-sensing device;

an auxiliary valve means mounted to the resilient valve for selectively blocking the circulation hole in the partition plate in response to movement of the resilient valve generated by deformation of the temperature-sensing member, said auxiliary valve being dimensioned to at least partly close the circulation hole prior to closing of the outflow-adjusting hole by the resilient valve member and to open the circulation hole subsequent to opening the outflow adjusting hole by the resilient valve member, whereby torque transmitted to the housing by the drive disk varies efficiently in accordance with the opening and closing of both the outflow-adjusting hole and the circulation hole by the resilient valve member and the auxiliary valve means respectively.

13. A temperature-controlled fan fluid coupling as in claim 12, wherein the auxiliary valve means is moveable relative to the resilient valve member.

14. A temperature-controlled fan fluid coupling as in claim 13, wherein the resilient valve member has a first end fixed to the resilient valve member and a second end moveable relative to the resilient valve member toward and away from the circulation hole formed in the partition plate.

15. A temperature-controlled fan fluid coupling s in claim 13, wherein the auxiliary valve means comprises a coil spring mounted to the resilient valve member and an auxiliary valve member mounted to the coil spring for selectively closing and opening the circulation hole in the partition plate.

16. A temperature-controlled fan fluid coupling as in claim 12, wherein the auxiliary valve means is a short cap projecting from the resilient valve member toward the partition plate, said cap being dimensioned to be advanced into the circulation hole in response to selected movements of the resilient valve member.

17. A temperature-controlled fan fluid coupling as in claim 16, wherein the short cap is provided with a plurality of adjusting holes formed therethrough.

* * * * *